United States Patent Office 3,272,783
Patented Sept. 13, 1966

3,272,783
RUBBERY POLYMER VULCANIZATION
Robert V. Lucke, Fanwood, N.J., assignor to United States Rubber Company, New York, N.Y., a corporation of New Jersey
No Drawing. Filed Jan. 31, 1963, Ser. No. 255,220
18 Claims. (Cl. 260—79.3)

The present invention relates in general to polymer curatives, and more particularly concerns a novel, swift-acting class of disulfonyl halide curative-accelerators which may be used, alone or in combination with conventional sulfur vulcanization, with or without subsequent heat treatment, to provide an improved cure of rubbery polymers having basic appendages (basic groups).

Although the prior art abounds with curatives and accelerators of innumerable types, each is subject to its particular infirmities. Some are effective only after a costly heat treatment (a heating period after vulcanization and removal of the stock from the mold to complete the cure and obtain optimum physical properties) requiring equipment, time, and temperatures substantially above 250° F. Others reach ultimate physical properties only after an extended curing time in the mold ranging upwards of 30 minutes, thereby necessarily lowering production rates with respect to the time and equipment involved. Still others are subject to both of the above-mentioned infirmities.

The present invention contemplates and has as a primary object the provision of a new class of curatives which can effect an improved cure in basic rubbery polymers in comparatively shorter time than conventional curatives and without the need of any subsequent heat treatment. Such an invention would be useful in articles where superior abrasion, compression set, hysteresis and tear strengths are required, such as in tire treads.

Another object of this invention is to provide a new method of vulcanization utilizing a disulfonyl halide as an accelerator for use with conventional curatives, e.g., sulfur.

Broadly speaking, the present invention utilizes a disulfonyl halide as a curative-accelerator which may be used alone or in combination with conventional vulcanization to provide a cure of rubbery polymers having basic appendages.

The disulfonyl halides used in my invention have the formula $R(SO_2X)_2$ in which X is fluorine, chlorine or bromine; R is an aliphatic radical (especially —$(CH_2)_{n'}$— where $n'$ is an integer of from 1 to 10), an aromatic radical (which may be substituted), or aromatic radicals separated by an O, S, or alkylidene group, e.g., —$CH_2$—. They are well-known and commercially available compounds.

Basic rubbery polymers, such as the basic amino rubbers, are defined in Rubber Chemistry and Technology, vol. 30, No. 5 (December 1957) pp. 1389–1399, which is hereby incorporated by reference. Typical basic monomers useful in this invention are mentioned in U.S. 3,004,938 and generally include: amines, dialkylaminoalkyl acrylates and methacrylates, and vinylpyridines such as 2-vinyl pyridine and 2-methyl-5-vinylpyridine. Especially, the preferred monomers, either aliphatic or aromatic, are those containing basic nitrogen groups. These basic monomers may be copolymerized with other monomers such as the aliphatic conjugated dienes; e.g., butadiene and isoprene; and vinyl monomers; e.g., styrene and acrylonitrile. I have found the disulfonyl halides to be uniquely effective as curative-accelerators of synthetic basic rubbers, such as diene-vinylpyridine copolymer rubber, and particularly butadiene-vinylpyridine rubbery copolymers.

It is to be understood that by curative-accelerator is meant a substance useful as either curative (or vulcanizer) or accelerator. Although as little as 1 and as much as 15 parts by weight of disulfonyl halide may be used per 100 parts by weight of rubber content, the preferred range is from 2 to 5 parts of disulfonyl halide per 100 parts of rubber.

Other objects and advantages will become readily apparent from a perusal of the following examples. All parts are by weight.

Example 1

A black masterbatch was prepared by Banbury mixing the ingredients shown in Table 1.

TABLE 1.—MASTERBATCH

| | |
|---|---|
| "Paracril UPBE" (a butadiene-vinyl-pyridine copolymer) | 100.0 |
| "Philblack O" (a high abrasion oil furnace carbon black consisting mainly of carbon) | 50.0 |
| "Paraflux" (a saturated, polymerized petroleum hydrocarbon plasticizer) | 3.0 |
| Stearic acid | 2.0 |
| | 155.0 |

Various disulfonyl chloride compounds were added to portions of the masterbatch on a cool mill and the standard ASTM D412–51T tests (American Society for the Testing and Materials) were used to determine the properties of the mixture after curing for 30 minutes at 307° F. as noted in Table 2.

TABLE 2

| | A | B | C |
|---|---|---|---|
| Masterbatch | 155.0 | 155.0 | 155.0 |
| 1,4-butane disulfonyl chloride | | 3.0 | |
| Oxy-bis-(benzene sulfonyl chloride) | | | 3.0 |
| 300% modulus (lbs./sq. in.) | 140 | 600 | 630 |
| Tensile strength (lbs./sq. in.) | 200 | 1,100 | 950 |

Properties of the disulfonyl chloride-cured rubber were superior to those of the rubber without the disulfonyl chloride.

Example 2

The effects of adding minor amounts of sulfur and zinc oxide to compositions like those of Example 1 (but using 5 parts of the disulfonyl chloride instead of 3 parts) were also tested (after curing for 30 minutes at 307° F.) and the superior properties of disulfonyl chlorides as accelerators are noted in Table 3.

TABLE 3

| | D | E | F |
|---|---|---|---|
| Masterbatch | 155.0 | 155.0 | 155.0 |
| 1,4-butane disulfonyl chloride | | 5.0 | |
| Oxy-bis-(benzene sulfonyl chloride) | | | 5.0 |
| Sulfur (curative) | 0.2 | 0.2 | 0.2 |
| Zinc oxide (activator) | 3.0 | 3.0 | 3.0 |
| 300% modulus (lbs./sq. in.) | 140 | 1,830 | 1,650 |
| Tensile strength (lbs./sq. in.) | 200 | 2,830 | 2,170 |

Example 3

1,4-butane disulfonyl chloride is shown as an accelerator in Table 4 in a stock compounded with 1.5 parts of sulfur and 0.25 part of a sulfenamide accelerator.

TABLE 4

|  | G | H |
|---|---|---|
| Masterbatch | 155.0 | 155.0 |
| 1,4-butane disulfonyl chloride |  | 3.0 |
| Zinc oxide (activator) | 3.0 | 3.0 |
| Sulfur (curative) | 1.5 | 1.5 |
| "Delac S" (accelerator: N-cyclohexyl-2-benzo-thiazole sulfenamide) | 0.25 | 0.25 |

Curing the stocks of Table 4 for varying times at 307° F. produced the properties noted in Table 5.

TABLE 5

|  | G | H |
|---|---|---|
| A—Thirty minute cure (conventional curing time): |  |  |
| 300% modulus (lbs./sq. in.) | 1,300 | 3,170 |
| Tensile strength (lbs./sq. in.) | 2,980 | 3,630 |
| Tear "C" (lb./in.) (ASTM D-624-54) | 350 | 420 |
| Mooney Scorch at 250° F. (minutes) (ASTM D1646-59T)g | 18.5 | 9.5 |
| B—Ten Minute Cure: |  |  |
| 300% Modulus (lbs./sq. in.) | 900 | 2,720 |
| Tensile (lbs./sq. in.) | 2,430 | 3,480 |
| Tear "C" (lbs./in.) (ASTM D-624-54) | 310 | 420 |
| Abrasion (loss in thousandths of an inch/300 cycles as measured on a standard U.S. Abrader) | .090 | .083 |

The disulfonyl chloride as accelerator produces stock (H) with superior properties over those produced in stock (G) by using a conventional accelerator and does so in a shorter curing time, thereby increasing productivity and at the same time eliminating the need of any subsequent heat treatment.

*Example 4*

Experiments with disulfonyl halides other than disulfonyl chloride showed that disulfonyl fluorides and bromides generally are effective curative-accelerators.

Many modifications of the compositions and processes of this invention will be apparent to those skilled in the art. Consequently it is to be understood that the precise proportions of the materials utilized may be varied and equivalent chemical materials may be employed, if desired, without departing from the spirit and scope of the invention as defined in the appended claims.

Having thus described my invention, what I claim and desire to protect by Letters Patent is:

1. A vulcanizable composition comprising a rubbery polymer containing a basic nitrogen group and a minor proportion of a disulfonyl halide having the formula $R(SO_2X)_2$, where X is a halogen selected from the group consisting of fluorine, chlorine and bromine; R is a member selected from the group consisting of aliphatic radicals, aromatic radicals, and aromatic radicals separated by a member selected from the group of oxygen, sulfur, and alkylidene groups.

2. The composition of claim 1 wherein said rubbery polymer is a diene-vinylpyridine rubber copolymer.

3. The composition of claim 2 wherein said rubbery polymer is a copolymer of butadiene and a vinylpyridine.

4. The composition of claim 1 wherein said disulfonyl halide is a disulfonyl chloride.

5. The composition of claim 4 wherein said disulfonyl chloride is selected from the group consisting of oxy-bis-(benzene sulfonyl chloride) and 1,4-butane disulfonyl chloride.

6. The composition of claim 1 wherein the aliphatic radical R is $-(CH_2)_{n'}-$ where $n'$ is an integer of from 1 to 10.

7. The composition of claim 1 having a minor proportion of a sulfur curative.

8. The composition of claim 1 having from 1 to 15 parts by weight of said disulfonyl halide per 100 parts of said rubbery polymer.

9. The composition of claim 8 having from 2 to 5 parts by weight of said disulfonyl halide per 100 parts of said rubbery polymer.

10. A method of vulcanizing rubber polymers having a basic nitrogen group comprising compounding said rubber with a minor proportion of a disulfonyl halide of the type $R(SO_2X)_2$ where X is a halogen selected from the group consisting of fluorine, chlorine and bromine; and R is a member selected from the group consisting of aliphatic radicals, aromatic radicals, and aromatic radicals separated by a member selected from the group consisting of oxygen, sulfur, alkylidene groups; and vulcanizing the resulting compound.

11. The method of claim 10 wherein said rubbery polymer is a diene-vinylpyridine copolymer.

12. The method of claim 11 wherein said rubbery polymer is a copolymer of butadiene and a vinylpyridine.

13. The method of claim 10 wherein said disulfonyl halide is a disulfonyl chloride.

14. The method of claim 13 wherein said disulfonyl chloride is selected from the group consisting of oxy-bis-(benzene sulfonyl chloride) and 1,4-butane disulfonyl chloride.

15. The method of claim 10 wherein the aliphatic radical R is $-(CH_2)_{n'}-$, where $n'$ is an integer of from 1 to 10.

16. The method of claim 10 wherein said rubbery polymer is compounded with a minor proportion of a sulfur curative.

17. The method of claim 10 wherein from 1 to 15 parts by weight of said disulfonyl halide are compounded with 100 parts of said rubbery polymer.

18. The method of claim 17 wherein from 2 to 5 parts by weight of said disulfonyl halide are compounded with 100 parts of said rubbery polymer.

References Cited by the Examiner

UNITED STATES PATENTS 2,927,099  3/1960  Railsback _____ 260—79.5
3,087,907  4/1963  Brucksch _____ 260—79.5

JOSEPH L. SCHOFER, *Primary Examiner.*

E. J. SMITH, *Assistant Examiner.*